US010239638B1

(12) United States Patent
Cohen et al.

(10) Patent No.: US 10,239,638 B1
(45) Date of Patent: Mar. 26, 2019

(54) HOME STATION FOR UNMANNED AERIAL VEHICLE

(71) Applicant: Wing Aviation LLC, Mountain View, CA (US)

(72) Inventors: Joanna Cohen, Mountain View, CA (US); Parsa Dormiani, San Mateo, CA (US); Mathias Samuel Fleck, Milpitas, CA (US); James Ryan Burgess, Redwood City, CA (US); Sean Mullaney, Mountain View, CA (US)

(73) Assignee: Wing Aviation LLC, Mountain View, CA (US)

(*) Notice: Subject to any disclaimer, the term of this patent is extended or adjusted under 35 U.S.C. 154(b) by 688 days.

(21) Appl. No.: 14/619,673

(22) Filed: Feb. 11, 2015

Related U.S. Application Data

(60) Provisional application No. 61/991,496, filed on May 10, 2014.

(51) Int. Cl.
B64F 1/00 (2006.01)
B64F 1/02 (2006.01)
(Continued)

(52) U.S. Cl.
CPC .............. B64F 1/04 (2013.01); B64C 39/024 (2013.01); B64F 1/02 (2013.01); B64F 1/025 (2013.01);
(Continued)

(58) Field of Classification Search
CPC .... B64F 1/04; B64F 1/02; B64F 1/025; B64C 39/024; B64C 2201/088; B64C 2201/024;
(Continued)

(56) References Cited

U.S. PATENT DOCUMENTS 4,123,020 A * 10/1978 Korsak ...................... B64F 1/00
244/115
6,056,237 A * 5/2000 Woodland ................. B64C 3/40
244/120
(Continued)

FOREIGN PATENT DOCUMENTS

WO 12/064891 A2 5/2012
WO 13/055265 A1 4/2013

OTHER PUBLICATIONS

Lum et al., "Telesurgery Via Unmanned Aerial Vehicle (UAV) with a Field Deployable Surgical Robot", Medicine Meets Virtual Reality 15, 2007, 313-315.
(Continued)

Primary Examiner — Richard R. Green
Assistant Examiner — Michael A. Fabula
(74) Attorney, Agent, or Firm — McDonnell Boehnen Hulbert & Berghoff LLP

(57) ABSTRACT

Described herein are apparatuses that provided various features related to unmanned aerial vehicles (UAVs). An example apparatus may include, among other features, (i) a launch system for a UAV, (ii) a landing feature that is arranged on the apparatus so as to receive the UAV when the UAV returns from a flight, and (iii) a mechanical battery-replacement system that is configured to (a) remove a first battery from the UAV, and (b) after removal of the first battery, install a second battery in the UAV.

17 Claims, 11 Drawing Sheets

(51) Int. Cl.
*B64F 1/04* (2006.01)
*B64F 1/18* (2006.01)
*B64C 39/02* (2006.01)

(52) U.S. Cl.
CPC .......... *B64F 1/18* (2013.01); *B64C 2201/022* (2013.01); *B64C 2201/024* (2013.01); *B64C 2201/025* (2013.01); *B64C 2201/088* (2013.01); *B64C 2201/104* (2013.01); *B64C 2201/108* (2013.01); *B64C 2201/128* (2013.01); *B64C 2201/141* (2013.01); *B64C 2201/145* (2013.01); *B64C 2201/146* (2013.01); *B64C 2201/182* (2013.01)

(58) Field of Classification Search
CPC ........ B64C 2201/182; B64C 2201/108; B64C 2201/128; B64C 2201/104
See application file for complete search history.

(56) References Cited

U.S. PATENT DOCUMENTS

| | | | |
|---|---|---|---|
| 6,567,044 B2 | 5/2003 | Carroll | |
| 6,817,573 B2 | 11/2004 | Harrison et al. | |
| 6,874,729 B1* | 4/2005 | McDonnell | B64C 25/68 244/63 |
| 6,965,816 B2 | 11/2005 | Walker | |
| 7,089,843 B2* | 8/2006 | Miller | F41A 23/42 89/1.806 |
| 7,175,135 B2* | 2/2007 | Dennis | B64C 25/68 244/110 C |
| 7,410,124 B2* | 8/2008 | Miller | B64C 39/024 124/65 |
| 7,472,866 B2* | 1/2009 | Heaston | B63G 8/28 244/63 |
| 7,574,193 B2 | 8/2009 | Hulkkonen et al. | |
| 7,665,691 B2* | 2/2010 | Hanzlick | B64F 1/10 244/63 |
| 7,813,888 B2 | 10/2010 | Vian et al. | |
| 7,877,785 B2 | 1/2011 | Selignan | |
| 8,028,952 B2* | 10/2011 | Urnes, Sr. | B63B 35/50 114/261 |
| 8,164,300 B2* | 4/2012 | Agassi | B60K 1/04 307/10.1 |
| 8,205,820 B2* | 6/2012 | Goossen | B64C 37/00 244/110 E |
| 8,276,844 B2* | 10/2012 | Kariv | B64F 1/02 244/110 C |
| 8,439,301 B1* | 5/2013 | Lussier | B64F 1/02 244/63 |
| 8,511,606 B1* | 8/2013 | Lutke | B64C 39/028 244/100 R |
| 8,774,982 B2* | 7/2014 | Oakley | B64C 27/08 244/17.23 |
| 8,880,241 B2* | 11/2014 | Mohamadi | B64C 19/00 244/190 |
| 8,909,391 B1* | 12/2014 | Peeters | G05D 1/0027 701/2 |
| 8,978,534 B2* | 3/2015 | Jacq | F41A 23/20 89/1.11 |
| 9,056,676 B1* | 6/2015 | Wang | B64F 1/00 |
| 9,061,102 B2* | 6/2015 | Levien | A61M 5/20 |
| 9,139,310 B1* | 9/2015 | Wang | B64F 1/36 |
| 9,254,363 B2* | 2/2016 | Levien | A61M 5/20 |
| 9,284,062 B2* | 3/2016 | Wang | B60L 11/1809 |
| 9,346,560 B2* | 5/2016 | Wang | B64F 1/36 |
| 9,421,869 B1* | 8/2016 | Ananthanarayanan | B60L 5/005 |
| 9,429,953 B1* | 8/2016 | Miller | G05D 1/0676 |
| 9,440,545 B2* | 9/2016 | Wang | B64F 1/36 |
| 9,448,562 B1* | 9/2016 | Sirang | G05D 1/0676 |
| 9,481,475 B2* | 11/2016 | Campillo | B64C 39/024 |
| 9,499,265 B2* | 11/2016 | Sanz | B64F 1/02 |
| 9,505,493 B2* | 11/2016 | Borko | B64C 39/024 |
| 9,527,605 B1* | 12/2016 | Gentry | B64F 1/12 |
| 9,545,852 B2* | 1/2017 | Streett | B64C 39/024 |
| 9,561,871 B2* | 2/2017 | Sugumaran | B64C 25/32 |
| 9,714,012 B1* | 7/2017 | Hoareau | B60S 5/06 |
| 9,718,564 B1* | 8/2017 | Beckman | G06Q 10/0832 |
| 9,764,836 B1* | 9/2017 | Elzinga | B64C 39/024 |
| 9,777,502 B2* | 10/2017 | Curlander | E04H 14/00 |
| 9,959,773 B2* | 5/2018 | Raptopoulos | G08G 5/0069 |
| 2005/0051667 A1* | 3/2005 | Arlton | B64C 27/10 244/17.11 |
| 2005/0151014 A1* | 7/2005 | McGeer | B64C 25/68 244/120 |
| 2005/0230536 A1* | 10/2005 | Dennis | B64C 39/024 244/110 C |
| 2006/0249622 A1* | 11/2006 | Steele | B64F 1/04 244/115 |
| 2007/0049251 A1 | 3/2007 | Mock et al. | |
| 2008/0085732 A1 | 4/2008 | Mizuide et al. | |
| 2009/0212157 A1* | 8/2009 | Arlton | B64C 27/10 244/63 |
| 2009/0242693 A1* | 10/2009 | Urnes, Sr. | B63B 35/50 244/63 |
| 2009/0294584 A1* | 12/2009 | Lovell | B63B 27/10 244/110 F |
| 2009/0314883 A1* | 12/2009 | Arlton | B64C 39/024 244/63 |
| 2010/0084513 A1 | 4/2010 | Gariepy et al. | |
| 2010/0256839 A1 | 10/2010 | Fitzpatrick | |
| 2010/0280699 A1 | 11/2010 | Bageshwar et al. | |
| 2011/0084162 A1* | 4/2011 | Goossen | B64C 39/024 244/12.1 |
| 2011/0106294 A1* | 5/2011 | Bebbington | B60L 11/1822 700/215 |
| 2011/0128372 A1 | 6/2011 | Malecki et al. | |
| 2011/0130636 A1 | 6/2011 | Daniel et al. | |
| 2011/0168838 A1* | 7/2011 | Hornback | B64C 39/028 244/63 |
| 2011/0267241 A1 | 11/2011 | Grimm et al. | |
| 2011/0281679 A1 | 11/2011 | Larrabee et al. | |
| 2011/0315806 A1 | 12/2011 | Piasecki et al. | |
| 2012/0080556 A1* | 4/2012 | Root, Jr. | B64F 1/02 244/63 |
| 2012/0152654 A1 | 6/2012 | Marcus | |
| 2013/0081245 A1* | 4/2013 | Vavrina | B60L 11/1822 29/402.08 |
| 2014/0022051 A1* | 1/2014 | Levien | A61M 5/20 340/5.2 |
| 2014/0022055 A1* | 1/2014 | Levien | A61M 5/20 340/5.64 |
| 2014/0025229 A1* | 1/2014 | Levien | A61M 5/20 701/2 |
| 2014/0025230 A1* | 1/2014 | Levien | A61M 5/20 701/2 |
| 2014/0032034 A1* | 1/2014 | Raptopoulos | G08G 5/0069 701/25 |
| 2014/0067159 A1* | 3/2014 | Levien | A61M 5/20 701/2 |
| 2014/0067160 A1* | 3/2014 | Levien | A61M 5/20 701/2 |
| 2014/0067167 A1* | 3/2014 | Levien | A61M 5/20 701/3 |
| 2015/0266575 A1* | 9/2015 | Borko | B64C 39/024 701/3 |
| 2016/0033966 A1* | 2/2016 | Farris | G01C 21/00 701/15 |
| 2016/0039540 A1* | 2/2016 | Wang | B64F 1/36 244/114 R |
| 2016/0140496 A1* | 5/2016 | Simms | G06Q 10/0835 705/337 |
| 2016/0163204 A1* | 6/2016 | Raptopoulos | G08G 5/0069 701/3 |
| 2016/0229299 A1* | 8/2016 | Streett | B64C 39/024 |
| 2016/0236582 A1* | 8/2016 | Wang | B64F 1/36 |

(56) References Cited

U.S. PATENT DOCUMENTS

2016/0257423 A1* 9/2016 Martin ................ B64F 1/00
2016/0364989 A1* 12/2016 Speasl ............. G08G 5/0034
2016/0375779 A1* 12/2016 Wang ................ B64F 1/36
                                                                                                 701/2

OTHER PUBLICATIONS

Nguyen et al., "Situation Identification by Unmanned Aerial Vehicle", Institute of Mathematics, 2001, 49-56.
Bone et al., "Unmanned Aerial Vehicles: Background and Issues for Congress", Report for Congress Congressional Research Service, 2003, 1-53.

* cited by examiner

HOME STATION FOR UNMANNED AERIAL VEHICLE

CROSS REFERENCE TO RELATED APPLICATION

This application claims priority to U.S. Provisional Application No. 61/991,496, filed on May 10, 2014, the contents of which are incorporated by reference herein for all purposes.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Take-off, landing, and maintenance procedures for unmanned aerial vehicles (UAVs) have not been standardized to any significant degree. As such, existing unmanned aerial vehicles (UAVs) typically require a properly-trained human operator to perform certain tasks in order to for a UAV to take off (e.g., launch). For example, before take off, a human operator may be required to retrieve the UAV, position it at a take-off location, and orient the UAV in a manner that facilitates state estimation. A human operator may also be required to perform certain tasks after a UAV lands. For example, post-landing tasks may include discharge of used batteries and/or installation of new, fully-charged, batteries, and/or maintenance and diagnostics tasks to ensure that the UAV will function properly on its next flight, among other possibilities. Further, safety precautions and procedures are typically implemented by individual human operators. Thus, human error can result in an accident when a human operator is performing tasks such as those described above.

Example embodiments may take the form of or otherwise relate to a home station for launching and landing a UAV. Such a home station may also be referred to herein as a "UAV nest," or simply as a "nest." A UAV nest may include features that facilitate launching and landing a UAV. Further, a UAV nest in accordance with an example embodiment may include features that help to automate pre-takeoff and post-landing tasks, and/or to standardize and simplify such task for a human operator, where a human operator is still required. Yet further, a nest may provide safety features that protect a human operator and/or safeguard against human error during pre-takeoff and post-landing tasks. In addition, a network of such nests may help operators to automate high-volume UAV mission execution with less technical knowledge, setup, and/or human intervention than was previously required.

In one aspect, an apparatus includes: (i) a launch system for an unmanned aerial vehicle (UAV); (ii) a landing feature that is arranged on the apparatus so as to receive the UAV when the UAV returns from a flight; and (iii) a mechanical battery-replacement system that is configured to (a) remove a first battery from the UAV, and (b) after removal of the first battery, install a second battery in the UAV.

In another aspect, an apparatus includes: (i) a launch system for an unmanned aerial vehicle (UAV); (ii) a landing feature that is arranged on the apparatus so as to receive the UAV when the UAV returns from a flight; (iii) a frame structure that comprises a roof and one or more side sections, wherein the one or more side sections and the roof form a human-sized chamber that is at least partially enclosed; and (iv) one or more human-operable control interfaces that are physically accessible from within the human-sized chamber, wherein the one or more human-operable control interfaces are operable to control at least the launch system, wherein at least a portion of the launch system is disposed within the human-sized chamber such that the UAV can be loaded onto the launch system from within the human-sized chamber, and wherein the landing feature is at least partially disposed on the roof.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
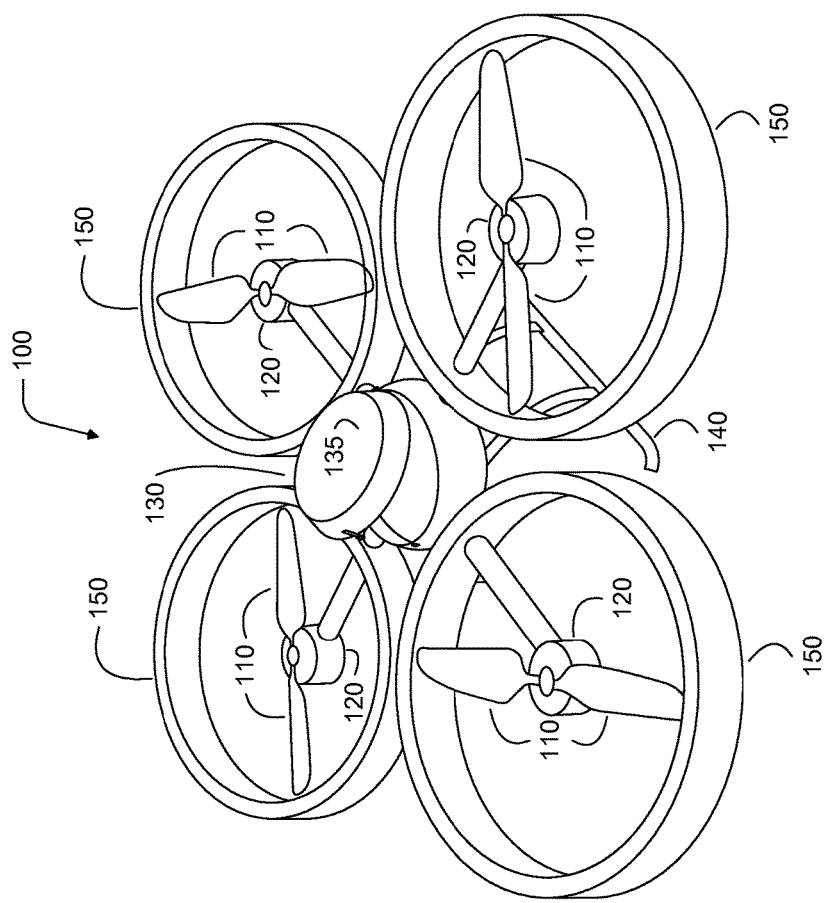
FIGS. 1, 2, 3, and 4 are simplified illustrations of unmanned aerial vehicles, according to example embodiments.

The following detailed description describes various features and functions of the disclosure with reference to the accompanying Figures. In the Figures, similar symbols typically identify similar components, unless context dictates otherwise. The illustrative apparati described herein are not meant to be limiting. It will be readily understood that certain aspects of the disclosure can be arranged and combined in a wide variety of different configurations, all of which are contemplated herein.

I. OVERVIEW

Example embodiments may take the form of or otherwise relate to a home station for launching and landing a UAV. Such a home station may also be referred to herein as a "UAV nest," or simply as a "nest." A UAV nest may include features that facilitate launching and landing a UAV. Further, an example UAV nest may include features that help to automate pre-takeoff and post-landing tasks, and/or to standardize and simplify such task for a human operator, where a human operator is still required. Yet further, a nest may provide safety features that protect a human operator and/or safeguard against human error during pre-takeoff and post-landing tasks. In addition, a network of such nests may help operators to automate high-volume UAV mission execution with less technical knowledge, setup, and/or human intervention than was previously required.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot. Examples of flight-related functions may include, but are not limited to, sensing its environment or operating in the air without a need for input from an operator, among others.

A UAV may be autonomous or semi-autonomous. For instance, some functions may be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 110 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself adjust the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
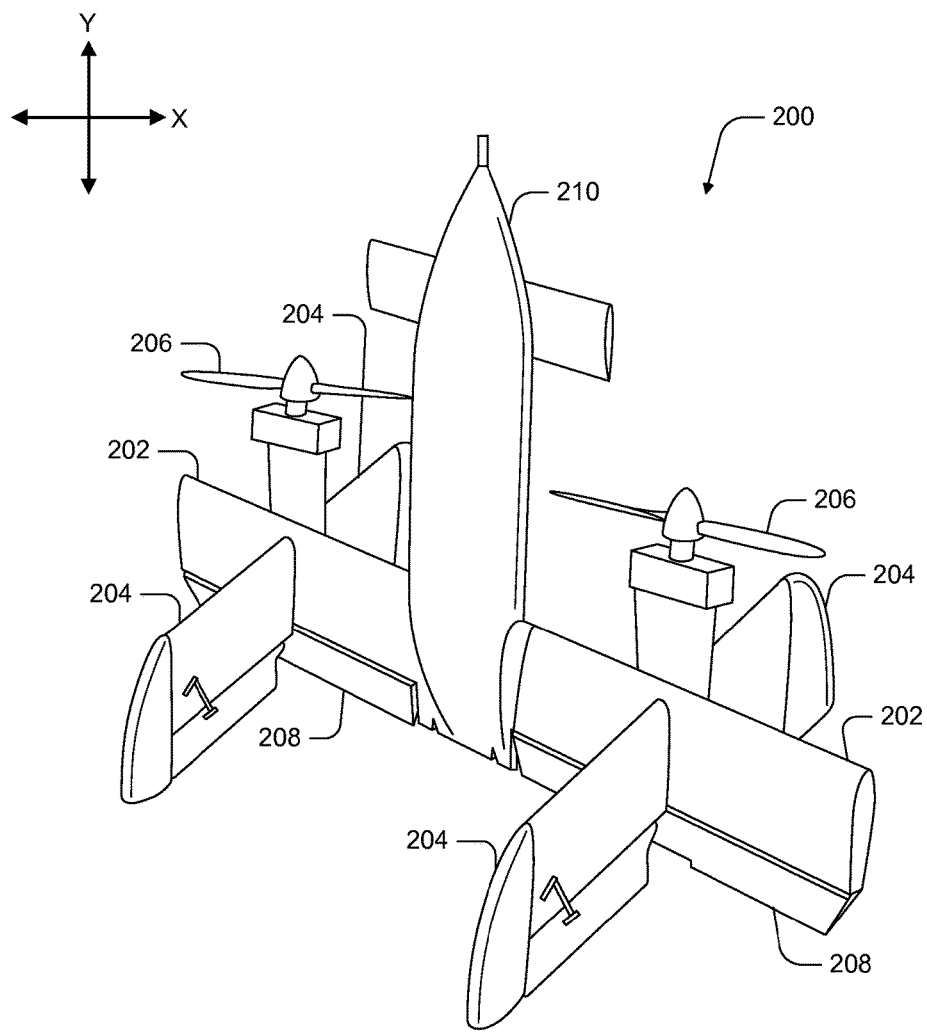

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3 and 4 are simplified illustrations of other types of UAVs, according to example embodiments.

Figure 3:
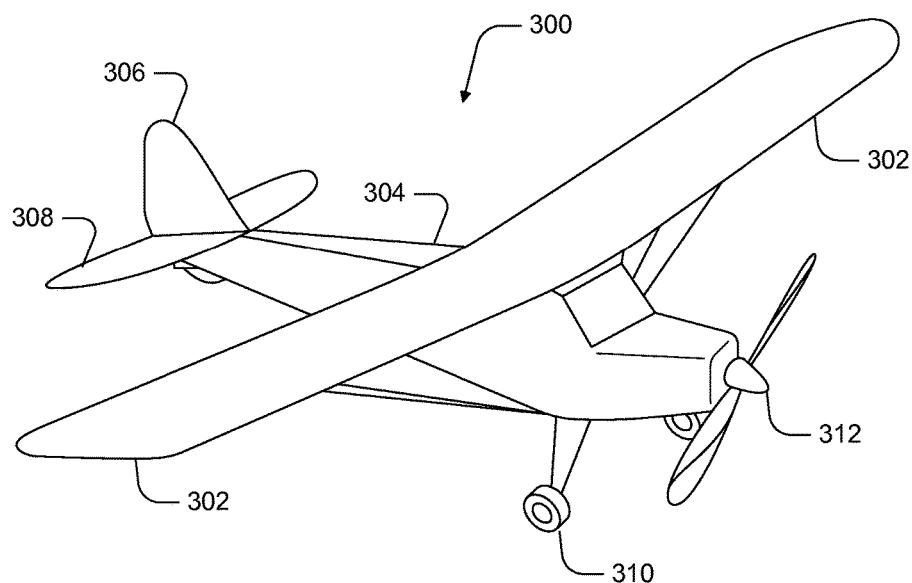

In particular, FIG. 3 shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3 depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 4:
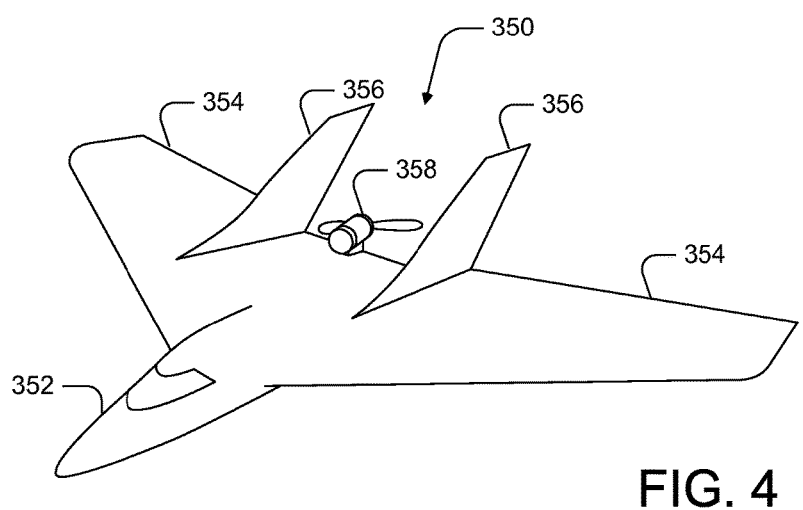

FIG. 4 shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3, FIG. 4 depicts common structures used in the pusher plane: a fuselage 352, two horizontal wings 354, vertical stabilizers 356, and a propulsion unit 358, which can include a motor, shaft, and propeller.

UAVs can be launched in various ways, using various types of launch systems. A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle, which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

III. ILLUSTRATIVE UAV SYSTEMS

Figure 5:
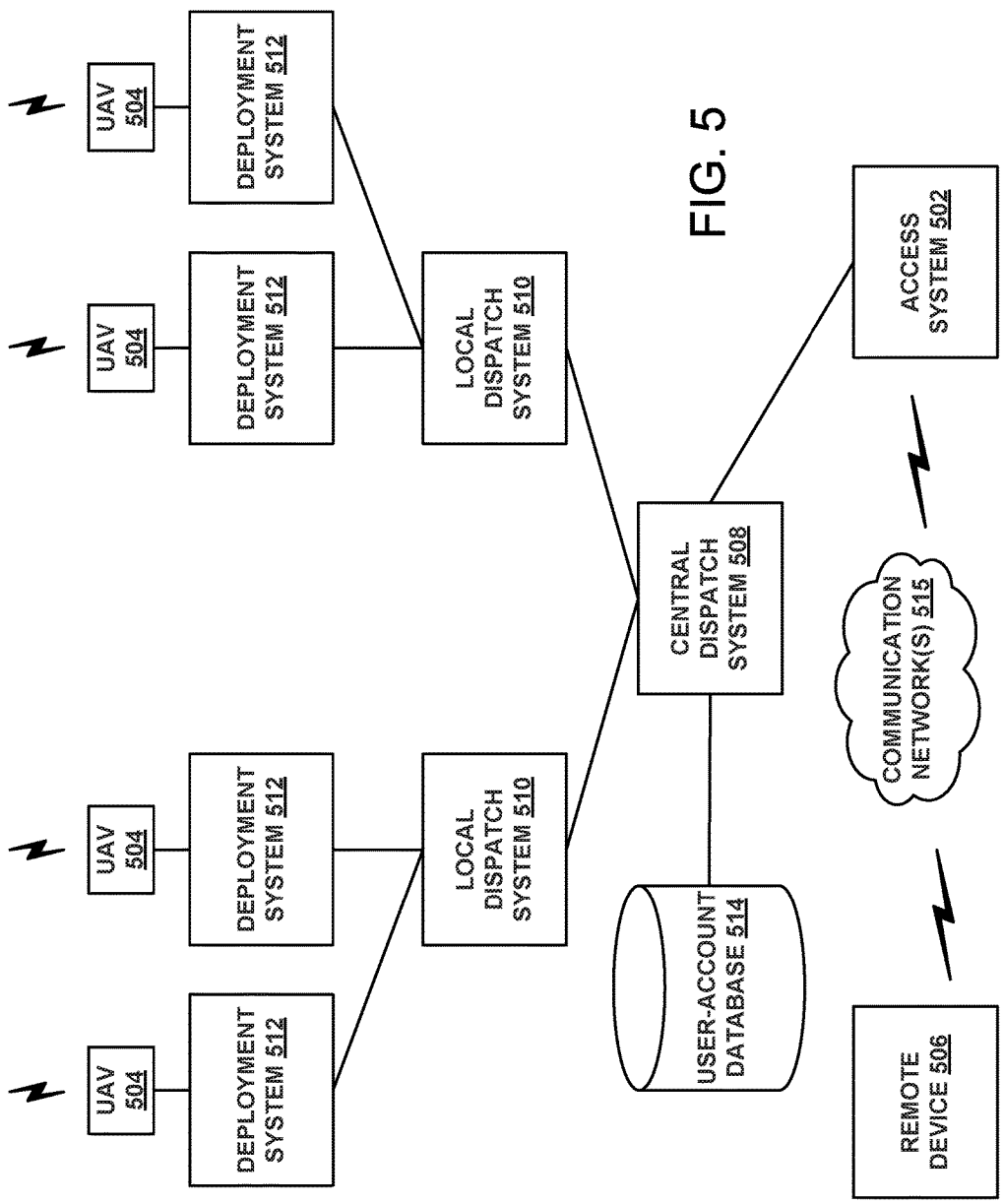
FIG. 5 is a simplified block diagram illustrating a UAV system, according to an example embodiment.

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to deliver various items to locations throughout the geographic area. As another example, a distributed UAV system may be provided in order to provide remote medical support, via UAVs. FIG. 5 is a simplified block diagram illustrating a distributed UAV system 500, according to an example embodiment.

In an illustrative UAV system 500, an access system 502 may allow for interaction with, control of, and/or utilization of a network of UAVs 504. In some embodiments, an access system 502 may be a computing system that allows for human-controlled dispatch of UAVs 504. As such, the control system may include or otherwise provide a user interface (UI) 503 via which a user can access and/or control UAVs 504. In some embodiments, dispatch of UAVs 504 may additionally or alternatively be accomplished via one or more automated processes.

Further, an access system 502 may provide for remote operation of a UAV. For instance, an access system 502 may allow an operator to control the flight of a UAV via user interface (UI). As a specific example, an operator may use an access system to dispatch a UAV 504 to deliver a package to a target location, or to travel to the location of a medical situation with medical-support items. The UAV 504 may then autonomously navigate to the general area of the target location. At this point, the operator may use the access system 502 to take over control of the UAV 504, and navigate the UAV to the target location (e.g., to a particular person to whom a package is being sent). Other examples of remote operation of a UAV are also possible.

In an illustrative embodiment, UAVs 504 may take various forms. For example, each UAV 504 may be a UAV such as those illustrated in FIGS. 1, 2, 3, and 4. However, medical support system 500 may also utilize other types of UAVs without departing from the scope of the invention. In some implementations, all UAVs 504 may be of the same or a similar configuration. However, in other implementations, UAVs 504 may include a number of different types of UAVs. For instance, UAVs 504 may include a number of types of UAVs, with each type of UAV being configured for a different type or types of medical support.

A remote device 506 may take various forms. Generally, a remote device 506 may be any device via which a direct or indirect request to dispatch UAV can be made. (Note that an indirect request may involve any communication that may be responded to by dispatching a UAV; e.g., requesting a package delivery, or sending a request for medical support). In an example embodiment, a remote device 506 may be a mobile phone, tablet computer, laptop computer, personal computer, or any network-connected computing device. Further, in some instances, remote device 506 may not be a computing device. As an example, a standard telephone, which allows for communication via plain old telephone service (POTS), may serve as a remote device 506. Other types of remote devices are also possible.

Further, a remote device 506 may be configured to communicate with access system 502 via one or more types of communication network(s) 515. For example, a remote device 506 could communicate with access system 502 (or via a human operator of the access system) by placing a phone call over a POTS network, a cellular network, and/or a data network such as the Internet. Other types of networks may also be utilized.

In some embodiments, a remote device 506 may be configured to allow a user to request delivery of one or more items to a desired location. For example, a user could request UAV delivery of a package to their home via their mobile phone, tablet, or laptop. As another example, a user could request dynamic delivery to whatever location they are at the time of delivery. To provide such dynamic delivery, a UAV system 500 may receive location information (e.g., GPS coordinates, etc.) from the user's mobile phone, or any other device on the user's person, such that a UAV can navigate to the user's location (as indicated by their mobile phone).

In some embodiments, a remote device 506 may be configured to allow a user to request medical support. For example, a person may use their mobile phone, a POTS phone, or a VoIP phone, to place an emergency call (e.g., a 9-1-1 call) and request that medical support be provided at the scene of an accident. Further, note that a request for medical support need not be explicit. For instance, a person may place a 9-1-1 call to report an emergency situation. When the 9-1-1 operator receives such a call, the operator may evaluate the information that is provided and decide that medical support is appropriate. Accordingly, the operator may use an access system 502 to dispatch a UAV 504.

As noted, a remote device 506 may be configured to determine and/or provide an indication of its own location. For example, remote device 506 may include a GPS system so that it can include GPS location information (e.g., GPS coordinates) in a communication to an access system 502 and/or to a dispatch system such as central dispatch system 508. As another example, a remote device 506 may use a technique that involves triangulation (e.g., between base stations in a cellular network) to determine its location. Alternatively, another system such as a cellular network may use a technique that involves triangulation to determine the location of a remote device 506, and then send a location message to the remote device 506 to inform the remote device of its location. Other location-determination techniques are also possible.

In an illustrative arrangement, central dispatch system 508 may be a server or group of servers, which is configured to receive dispatch messages requests and/or dispatch instructions from an access system 502. Such dispatch messages may request or instruct the central dispatch system 508 to coordinate the deployment of UAVs to various target locations. A central dispatch system 508 may be further configured to route such requests or instructions to local dispatch systems 510. To provide such functionality, central dispatch system 508 may communicate with access system 502 via a data network, such as the Internet or a private network that is established for communications between access systems and automated dispatch systems.

In the illustrated configuration, central dispatch system 508 may be configured to coordinate the dispatch of UAVs 504 from a number of different local dispatch systems 510. As such, central dispatch system 508 may keep track of which UAVs 504 are located at which local dispatch systems 510, which UAVs 504 are currently available for deployment, and/or which services or operations each of the UAVs 504 is configured for (in the event that a UAV fleet includes multiple types of UAVs configured for different services and/or operations). Additionally or alternatively, each local dispatch system 510 may be configured to track which of its associated UAVs 504 are currently available for deployment, and/or to track which services or operations each of its associated UAVs is configured for.

In some cases, when central dispatch system 508 receives a request for UAV-related service from an access system 502, central dispatch system 508 may select a specific UAV 504 to dispatch. The central dispatch system 508 may accordingly instruct the local dispatch system 510 that is associated with the selected UAV to dispatch the selected UAV. The local dispatch system 510 may then operate its associated deployment system 512 to launch the selected UAV. In other cases, a central dispatch system 508 may forward a request for a UAV-related service to a local dispatch system 510 that is near the location where the support is requested, and leave the selection of a particular UAV 504 to the local dispatch system 510.

In some embodiments, each deployment system 512 may take the form of a nest or possibly multiple nests, such as the illustrative nests described herein. Alternatively, a each nest could include one or more deployment systems 512. In other configurations, a nest may include or provide some or all of the functionality of a local dispatch system 510 and/or a central dispatch system 508. It should be understood, however, that a nest may additionally or alternatively provide other functionality and/or include other systems.

In an example configuration, a local dispatch system 510 may be implemented in a computing system at the same location as the deployment system or systems 512 that it controls. For example, in some embodiments, a local dispatch system 510 could be implemented by a computing system at a building, such as a fire station, where the deployment systems 512 and UAVs 504 that are associated with the particular local dispatch system 510 are also located. In other embodiments, a local dispatch system 510 could be implemented at a location that is remote to its associated deployment systems 512 and UAVs 404.

Numerous variations on and alternatives to the illustrated configuration of medical support system 500 are possible. For example, in some embodiments, a user of a remote device 506 could request medical support directly from a central dispatch system 508. To do so, an application may be implemented on a remote device 506 that allows the user to provide information regarding a requested service, and generate and send a data message to request that the UAV system provide the service. In such an embodiment, central dispatch system 508 may include automated functionality to handle requests that are generated by such an application, evaluate such requests, and, if appropriate, coordinate with an appropriate local dispatch system 510 to deploy a UAV.

Further, in some implementations, some or all of the functionality that is attributed herein to central dispatch system 508, local dispatch system(s) 510, access system 502, and/or deployment system(s) 512 could be combined in a single system, implemented in a more complex system, and/or redistributed among central dispatch system 508, local dispatch system(s) 510, access system 502, and/or deployment system(s) 512 in various ways.

Yet further, while each local dispatch system 510 is shown as having two associated deployment systems, a given local dispatch system 510 may have more or less associated deployment systems. Similarly, while central dispatch system 508 is shown as being in communication with two local dispatch systems 510, a central dispatch system may be in communication with more or less local dispatch systems 510.

In a further aspect, a deployment system 512 may take various forms. In general, a deployment system may take the form of or include a system for physically launching a UAV 504. Such a launch system may include features that allow for a human-assisted UAV launch and/or features that provide for an automated UAV launch. Further, a deployment system 512 may be configured to launch one particular UAV 504, or to launch multiple UAVs 504.

A deployment system 512 may further be configured to provide additional functions, including for example, diagnostic-related functions such as verifying system functionality of the UAV, verifying functionality of devices that are housed within a UAV (e.g., such as a defibrillator, a mobile phone, or an HIVID), and/or maintaining devices or other items that are housed in the UAV (e.g., by charging a defibrillator, mobile phone, or HIVID, or by checking that medicine has not expired).

In some embodiments, the deployment systems 512 and their corresponding UAVs 504 (and possibly associated local dispatch systems 510) may be strategically distributed throughout an area such as a city. For example, deployment systems 512 may be located on the roofs of certain municipal buildings, such as fire stations, which can thus serve as the dispatch locations for UAVs 504. Fire stations may function well for UAV dispatch, as fire stations tend to be distributed well with respect to population density, their roofs tend to be flat, and the use of firehouse roofs as leased spaces for UAV dispatch could further the public good. However, deployment systems 512 (and possibly the local dispatch systems 510) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 500 may include or have access to a user-account database 514. The user-account database 514 may include data for a number of user-accounts, and which are each associated with one or more person. For a given user-account, the user-account database 514 may include data related to or useful in providing UAV-related services. Typically, the user data associated with each user-account is optionally provided by an associated user and/or is collected with the associated user's permission.

Further, in some embodiments, a person may have to register for a user-account with the UAV system 500 in order to use or be provided with UAV-related services by the UAVs 504 of medical-support system 500. As such, the user-account database 514 may include authorization information for a given user-account (e.g., a user-name and password), and/or other information that may be used to authorize access to a user-account.

In some embodiments, a person may associate one or more of their devices with their user-account, such that they can be provided with access to the services of UAV system 500. For example, when a person uses an associated mobile phone to, e.g., place a call to an operator of access system 402 or send a message requesting a UAV-related service to a dispatch system, the phone may be identified via a unique device identification number, and the call or message may then be attributed to the associated user-account. Other examples are also possible.

IV. ILLUSTRATIVE COMPONENTS OF A UAV

Figure 6:
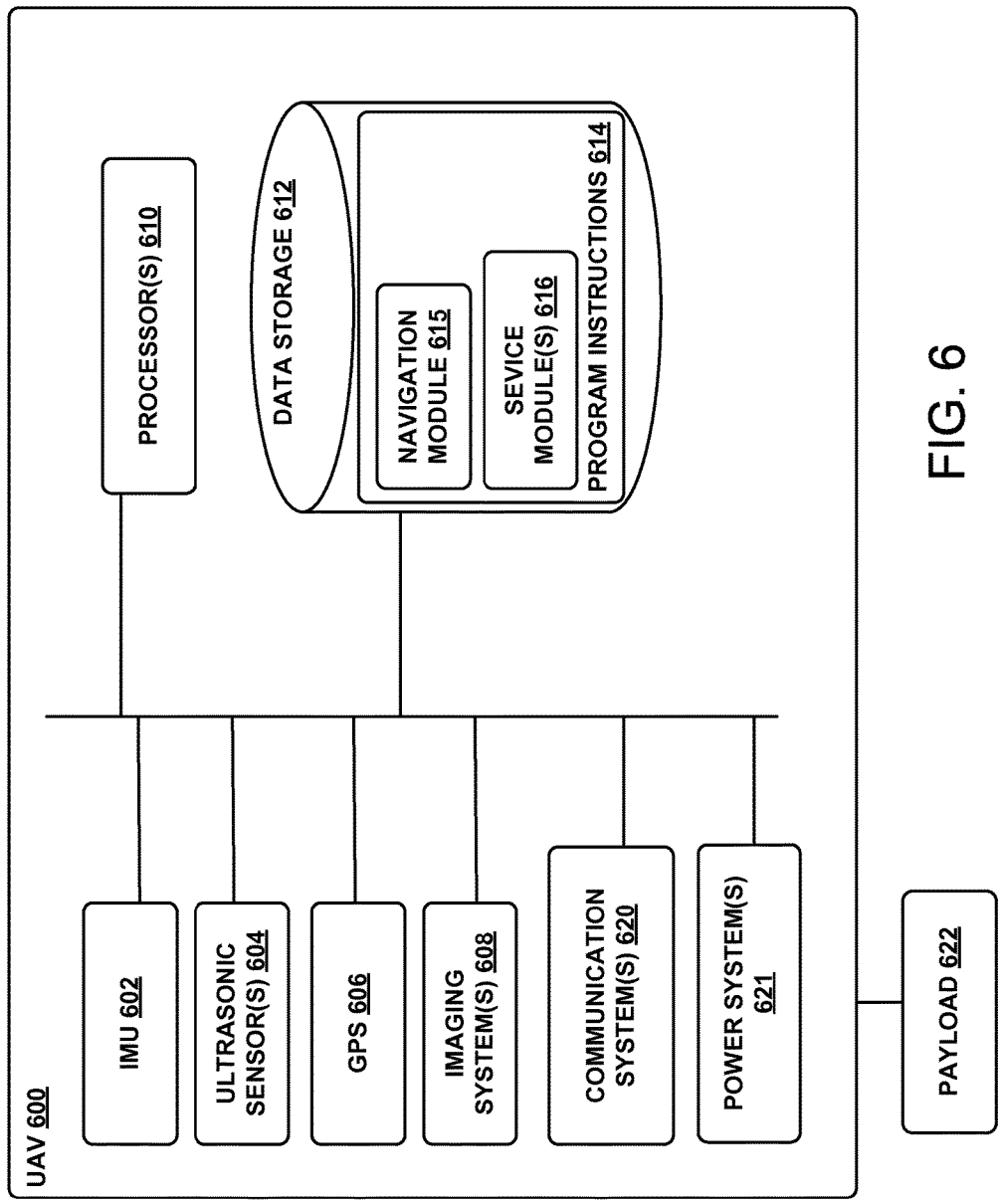
FIG. 6 is a simplified block diagram illustrating components of an unmanned aerial vehicle, according to an example embodiment.

FIG. 6 is a simplified block diagram illustrating components of a UAV 600, according to an example embodiment. UAV 600 may take the form of, or be similar in form to, one of the UAVs 100, 200, 300, and 350 described in reference to FIGS. 1, 2, 3, and 4. However, a UAV 600 may also take other forms.

UAV 600 may include various types of sensors, and may include a computing system configured to provide the functionality described herein. In the illustrated embodiment, the sensors of UAV 600 include an inertial measurement unit (IMU) 602, ultrasonic sensor(s) 604, GPS 606, imaging system(s) 608, among other possible sensors and sensing systems.

In the illustrated embodiment, UAV 600 also includes one or more processors 610. A processor 610 may be a general-purpose processor or a special purpose processor (e.g., digital signal processors, application specific integrated circuits, etc.). The one or more processors 610 can be configured to execute computer-readable program instructions 614 that are stored in the data storage 612 and are executable to provide the functionality of a UAV described herein.

The data storage 612 may include or take the form of one or more computer-readable storage media that can be read or accessed by at least one processor 610. The one or more computer-readable storage media can include volatile and/or non-volatile storage components, such as optical, magnetic, organic or other memory or disc storage, which can be integrated in whole or in part with at least one of the one or more processors 610. In some embodiments, the data storage 612 can be implemented using a single physical device (e.g., one optical, magnetic, organic or other memory or disc storage unit), while in other embodiments, the data storage 612 can be implemented using two or more physical devices.

As noted, the data storage 612 can include computer-readable program instructions 614 and perhaps additional data, such as diagnostic data of the UAV 600. As such, the data storage 614 may include program instructions to perform or facilitate some or all of the UAV functionality described herein. For instance, in the illustrated embodiment, program instructions 614 include a navigation module 615 and one or more service modules 616.

A. Sensors

In an illustrative embodiment, IMU 602 may include both an accelerometer and a gyroscope, which may be used together to determine the orientation of the UAV 600. In particular, the accelerometer can measure the orientation of the vehicle with respect to earth, while the gyroscope measures the rate of rotation around an axis. IMUs are commercially available in low-cost, low-power packages. For instance, an IMU 602 may take the form of or include a miniaturized MicroElectroMechanical System (MEMS) or a NanoElectroMechanical System (NEMS). Other types of IMUs may also be utilized.

An IMU 602 may include other sensors, in addition to accelerometers and gyroscopes, which may help to better determine position and/or help to increase autonomy of the UAV 600. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 600, slight errors in measurement may compound over time and result in a more significant error. However, an example UAV 600 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 600 may also include a pressure sensor or barometer, which can be used to determine the altitude of the UAV 600. Alternatively, other sensors, such as sonic altimeters or radar altimeters, can be used to provide an indication of altitude, which may help to improve the accuracy of and/or prevent drift of an IMU.

In a further aspect, UAV 600 may include one or more sensors that allow the UAV to sense objects in the environment. For instance, in the illustrated embodiment, UAV 600 includes ultrasonic sensor(s) 604. Ultrasonic sensor(s) 604 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 600 also includes a GPS receiver 606. The GPS receiver 606 may be configured to provide data that is typical of well-known GPS systems, such as the GPS coordinates of the UAV 600. Such GPS data may be utilized by the UAV 600 for various functions. As such, the UAV may use its GPS receiver 606 to help navigate to the caller's location, as indicated, at least in part, by the GPS coordinates provided by their mobile device. Other examples are also possible.

UAV 600 may also include one or more imaging system(s) 608. For example, one or more still and/or video cameras may be utilized by a UAV 600 to capture image data from the UAV's environment. As a specific example, charge-coupled device (CCD) cameras or complementary metal-oxide-semiconductor (CMOS) cameras can be used with unmanned vehicles. Such imaging sensor(s) 608 have numerous possible applications, such as obstacle avoidance, localization techniques, ground tracking for more accurate navigation (e,g., by applying optical flow techniques to images), video feedback, and/or image recognition and processing, among other possibilities.

In a further aspect, UAV 600 may use its one or more imaging system 608 to help in determining location. For example, UAV 600 may capture imagery of its environment and compare it to what it expects to see in its environment given current estimated position (e.g., its current GPS coordinates), and refine its estimate of its position based on this comparison.

In a further aspect, UAV 600 may include one or more microphones. Such microphones may be configured to capture sound from the UAVs environment.

B. Navigation and Location Determination

The navigation module 615 may provide functionality that allows the UAV 600 to, e.g., move about in its environment and reach a desired location. To do so, the navigation module 615 may control the altitude and/or direction of flight by controlling the mechanical features of the UAV that affect flight (e.g., rotors 110 of UAV 100).

In order to navigate the UAV 600 to a target location, a navigation module 615 may implement various navigation techniques, such as map-based navigation and localization-based navigation, for instance. With map-based navigation, the UAV 600 may be provided with a map of its environment, which may then be used to navigate to a particular location on the map. With localization-based navigation, the UAV 600 may be capable of navigating in an unknown environment using localization. Localization-based navigation may involve a UAV 600 building its own map of its environment and calculating its position within the map and/or the position of objects in the environment. For example, as a UAV 600 moves throughout its environment, the UAV 600 may continuously use localization to update its map of the environment. This continuous mapping process may be referred to as simultaneous localization and mapping (SLAM). Other navigation techniques may also be utilized.

In some embodiments, the navigation module 615 may navigate using a technique that relies on waypoints. In particular, waypoints are sets of coordinates that identify points in physical space. For instance, an air-navigation waypoint may be defined by a certain latitude, longitude, and altitude. Accordingly, navigation module 615 may cause UAV 600 to move from waypoint to waypoint, in order to ultimately travel to a final destination (e.g., a final waypoint in a sequence of waypoints).

In a further aspect, navigation module 615 and/or other components and systems of UAV 600 may be configured for "localization" to more precisely navigate to the scene of a medical situation. More specifically, it may be desirable in certain situations for a UAV to be close to the person to whom an item is being delivered by a UAV (e.g., within reach of the person). To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 600 may navigate to the general area of a person to whom an item is being delivered using waypoints. Such waypaints may be pre-determined based on GPS coordinates provided by a remote device at the target delivery location. The UAV may then switch to a mode in which it utilizes a localization process to locate and travel to a specific location of the person in need. For instance, if a person is having a heart attack at a large stadium, a UAV 600 carrying a medical package may need to be within reach of the person or someone near the person so that the can take items from the package. However, a GPS signal may only get a UAV so far, e.g., to the stadium. A more precise location-determination technique may then be used to find the specific location of the person within the stadium.

Various types of location-determination techniques may be used to accomplish localization of a person or a device once a UAV 600 has navigated to the general area of the person or device. For instance, a UAV 600 may be equipped with one or more sensory systems, such as, for example, imaging system(s) 608, a directional microphone array (not shown), ultrasonic sensors 604, infrared sensors (not shown), and/or other sensors, which may provide input that the navigation module 615 utilizes to navigate autonomously or semi-autonomously to the specific location of a person.

As another example, once the UAV 600 reaches the general area of a target delivery location (or of a moving subject such as a person or their mobile device), the UAV 600 may switch to a "fly-by-wire" mode where it is controlled, at least in part, by a remote operator, who can navigate the UAV 600 to the specific location of the person in need. To this end, sensory data from the UAV 600 may be sent to the remote operator to assist them in navigating the UAV to the specific location. For example, the UAV 600 may stream a video feed or a sequence of still images from the UAV's imaging system(s) 608. Other examples are possible.

As yet another example, the UAV 600 may include a module that is able to signal to a passer-by for assistance in either reaching the specific target delivery location; for example, a UAV may displaying a visual message requesting such assistance in a graphic display, play an audio message or tone through speakers to indicate the need for such assistance, among other possibilities. Such a visual or audio message might indicate that assistance is needed in delivering the UAV 600 to a particular person or a particular location, and might provide information to assist the passer-by in delivering the UAV 600 to the person or location (e.g., a description or picture of the person or location, and/or the person or location's name), among other possibilities. Such a feature can be useful in a scenario in which the UAV is unable to use sensory functions or another location-determination technique to determine the specific location of the person. However, this feature is not limited to such scenarios.

In some embodiments, once a UAV 600 arrives at the general area of a person who requested service and/or at the general area that includes a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV so it can move in the determined manner.

C. Communication Systems

In a further aspect, UAV 600 includes one or more communication systems 620. The communications systems 620 may include one or more wireless interfaces and/or one or more wireline interfaces, which allow UAV 600 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 600 may include communication systems 620 that allow for both short-range communication and long-range communication. For example, the UAV 600 may be configured for short-range communications using Bluetooth and for long-range communications under a CDMA protocol. In such an embodiment, the UAV 600 may be configured to function as a "hot spot;" or in other words, as a gateway or proxy between a remote support device and one or more data networks, such as cellular network and/or the Internet. Configured as such, the UAV 600 may facilitate data communications that the remote support device would otherwise be unable to perform by itself.

For example, UAV 600 may provide a WiFi connection to a remote device, and serve as a proxy or gateway to a cellular service provider's data network, which the UAV might connect to under an LTE or a 3G protocol, for instance. The UAV 600 could also serve as a proxy or gateway to a high-altitude balloon network, a satellite network, or a combination of these networks, among others, which a remote device might not be able to otherwise access.

D. Power Systems

In a further aspect, UAV 600 may include power system(s) 621. A power system 621 may include one or more batteries for providing power to the UAV 600. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 600 may employ various systems and configurations in order to transport items. In the illustrated embodiment, a payload 622 may serve as a compartment that can hold one or more items, such that a UAV 600 can deliver the one or more items to a target delivery location. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible.

In some implementations, the payload 622 of a given UAV 600 may include or take the form of a "package" designed to transport medical-support items to a target delivery location. For example, a medical-support UAV may include a package with one or more items for medical support in the particular medical situation, and/or one or more medical-support modules 616 that are designed to provide medical support in the particular medical situation. In some cases, a UAV 600 may include a package that is designed for a particular medical situation such as choking, cardiac arrest, shock, asthma, drowning, etc. In other cases, a UAV 600 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HIVID), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 621 for power.

In some embodiments, a UAV 600 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 600 might function as a mobile defibrillator. Specifically, rather than carry a stand-alone defibrillator that can then be removed from the UAV for use, the UAV itself may function as a defibrillator.

F. Service Modules

As noted above, UAV 600 may include one or more service modules 916. The one or more service modules 616 include software, firmware, and/or hardware that may help to provide or assist in the provision of the UAV-related services.

Configured as such, a UAV 600 may provide various types of service. For instance, a UAV 600 may have stored information that can be provided to a person or persons at the target location, in order to assist the person or persons in various ways. For example, a UAV may include a video or audio file with instructions for performing some task, which the UAV can play out to a person at the target location. As another example, a UAV may include an interactive program to assist a person at the target location in performing some task. For instance, a UAV may include an application that analyzes the person's speech to detect questions related to the medical situation and/or that provides a text-based interface via which the person can ask such questions, and then determines and provides answers to such questions.

In some embodiments, a UAV 600 may facilitate communication between a layperson and/or medical personnel at the scene and medical personnel at a remote location. As an example, a service module 616 may provide a user interface via which a person at the scene can use a communication system 620 of the UAV to communicate with an emergency medical technician at a remote location. As another example, the UAV 600 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

V. ILLUSTRATIVE UAV NESTS

Figure 7:
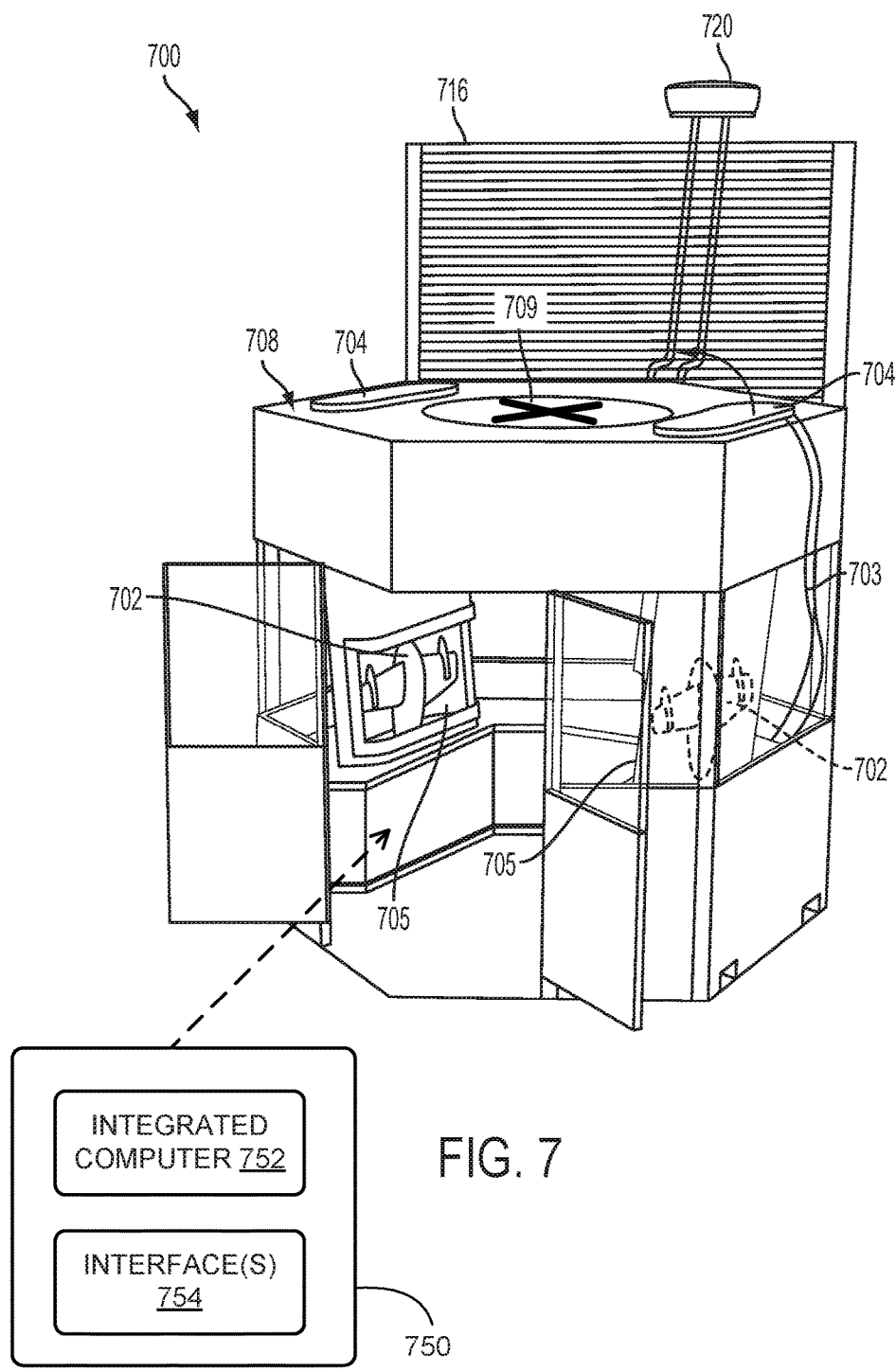
FIG. 7 is an illustration of a nest, according to an example embodiment.

In some embodiments, a nest for a UAV may be a home station that includes a landing feature, automated battery recharging and/or swapping systems, maintenance systems, and/or a launch system that operates without physical intervention from an operator (or perhaps with less physical intervention than might otherwise be required). FIG. 7 is an illustration of a nest, according to an example embodiment. An example nest 700 may be built on a frame structure, which in the illustrated example is a hexagonal frame, which supports a landing pad 709 and includes one or more launch systems. The nest 700 is generally arranged on a frame structure, which supports a roof on which the landing pad 709 is disposed, and includes side sections that provide a human-sized chamber beneath the roof. The chamber is partially closed and provides access to two launch systems that are substantially housed within the chamber, such that a human operator can operate the launch systems from within the chamber.

Herein, a "human-sized" chamber or room should be understood to be any wholly or partially enclosed volume that is large enough to be occupied by a human, while the human is utilizing input interfaces in the chamber (e.g., control interfaces for a nest and/or a UAV). For instance, the interior of nest 700 may provide enough room under roof 708 for some or most humans to stand up fully (e.g., five feet or more or of clearance), while accessing a UAV 702. As such, the interior of nest 700 may be considered to be "human-sized" chamber. In other cases, a human-sized chamber may not provide enough room for the average human to stand up fully. For example, a chamber with a seat, which is sized to accommodate a human sitting in the seat, may be considered to be a human-sized chamber, regardless of whether or not the chamber is large enough for the human to stand up fully.

An example launch system includes a launch tube 703 and a panel 705 that can be opened or closed to access or restrict access to the interior of the launch tube. An operator may thus open panel 705 and place a UAV 702 on a launch mechanism that is operable to propel the UAV 702 upwards through the launch tube 703 and out of an opening in the roof that is provided when the launch-tube hatch 704 is opened. Note that in some implementations, a UAV, such as a tail-sitter UAV, may also be configured to launch directly from the roof 708 of the nest (e.g., from the landing pad 709).

Figure 8A:
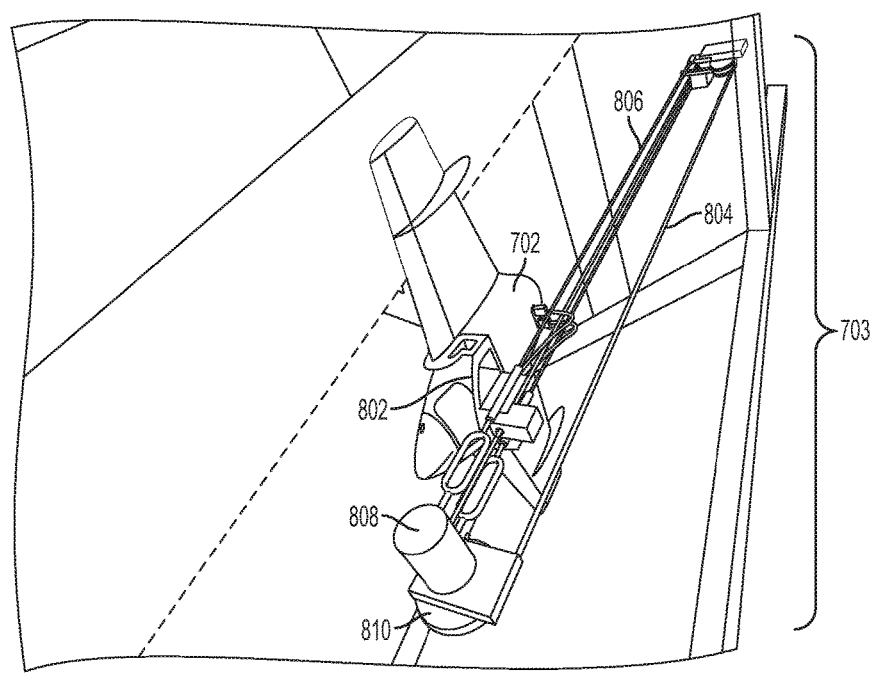
FIG. 8A shows a launch system, according to an example embodiment.

In a further aspect, the panel may help to improve the safety for a human operator of an example next 700. For example, the launch system may require that the moveable panel 705 be closed in order for a launch process to be initiated. FIG. 8A shows an example launch system in greater detail. In particular, FIG. 8A shows an interior view of a launch tube 703. The launch system includes a UAV attachment feature (e.g., a launch sled 802) within the launch tube, which connects the UAV 702 to a launch mechanism. (Note that a human operator may place a UAV on the launch sled 802 through the opening provided when panel 705 is opened.) The launch mechanism includes a launch guide (e.g., guide wires 806), a launch cable 804 to which the launch sled 802 is attached, and a motor 808. The motor 808 is operable to launch the UAV 702 by moveing the launch cable 804 around a pulley system 810, thus propelling the launch sled 802 and the attached UAV 702 upward through the launch tube 703 such that the UAV that is propelled through an opening at a top end of the launch tube. Note that while the nest 700 shown in FIG. 7 includes two launch systems for UAVs 702, a single launch system or more than two launch systems such as shown in FIG. 8A are also possible.

Referring again to FIG. 7, in the illustrated example, a landing pad 709 may be arranged on the roof of the nest, such that the landing pad is accessible for a UAV to land thereon. The landing pad may include a launch hatch 704 at the top end of each launch tube 703. A launch hatch 704 may be configured to open as part of a launch process (and possibly only if the interior access panel to the launch tube is closed), and to otherwise remain closed, thereby sealing the opening at the top of launch tube 703 when no UAV is being launched.

In some embodiments, the landing pad may include a zero-impact or low-impact grass surface on which the UAV can land. Further, the landing pad 709 may include at least one visual feature to assist a UAV in landing on the landing pad, such as a distinctively colored "X" on its surface or a beacon that the onboard camera in a UAV can use to accurately locate and land on the landing pad (e.g., using Visual Odometry).

In another aspect, ultrasonic or IR transmitters (not shown) on or near landing pad 709 could be used to help improve a UAV's landing accuracy. In such embodiments, the UAV 702 may include ultrasonic or IR receivers that can receive signals from the nest's transmitters, and use the received signals to help locate the landing pad 709.

In a further aspect, a recovery net 716 may be adjacent to the landing pad. The recovery net 716 may be arranged such that when the UAV is in the process of landing, the recovery net receives the UAV and/or guides the UAV towards the landing pad. The may recovery net 716 also improve safety, e.g., by protecting those that might be in the vicinity of the nest.

In some embodiments, a horizontal net could be placed around a landing pad as a safety measure. For example, a "donut-shaped" net could be placed around the circumference of landing pad 709, which may protect the UAV and/or prevent the UAV from falling off the roof of the nest 700, in the event the UAV misses the landing pad 709 by a small amount. Other examples of such nets surrounding a landing pad are also possible.

In some embodiments, the nest's landing feature may include or take the form of a horizontally-arranged recovery net, which may be used instead of a landing pad 709. In such an embodiment, a horizontal recovery net may be raised, such that there is an air gap underneath the horizontal recovery net (e.g., a gap between the recovery net and the roof of the nest), such that the recovery net can stretch in order to support, and possibly to "catch" a UAV. Such a horizontal recovery net may include similar visual features to assist in landing as described in reference to landing pad 709.

To illustrate, consider a scenario where a UAV is landing on a nest that is equipped with a horizontal recovery net on its roof. When returning from a flight, the UAV could switch to a hover mode, lower itself close to the net, and then power off or reduce power to its motors so that it falls into the horizontal recovery net. This type of horizontal recovery net may therefore be particularly useful if a UAV does not have landing gear (e.g., feet or wheels). Of course, a horizontal recovery net may be useful for other landing techniques and/or for other types of UAVs (e.g., UAVs that have landing gear).

In a further aspect, the nest 700 may include one or more mechanical battery-replacement systems, which may each be configured to: (a) remove a first battery from the UAV, (b) connect the first battery to a charging system, and (c) after removal of the first battery, install a second battery in the UAV.

Figure 8B:
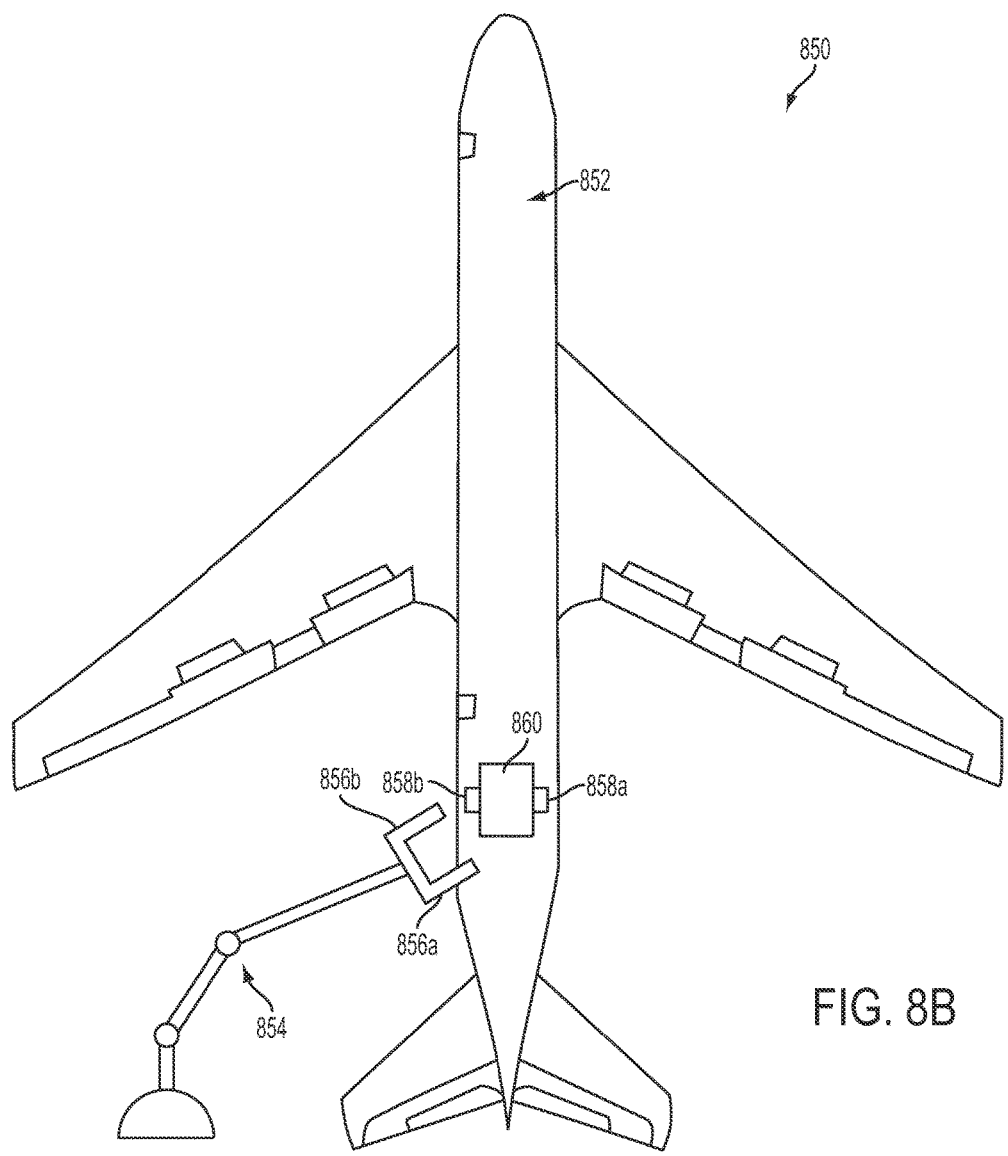
FIG. 8B shows a battery-replacement system, according to an example embodiment.

For example, FIG. 8B is simplified illustrations of battery-replacement systems, according to example embodiments. In particular, FIG. 8B shows an example in which a small robotic arm 804 is installed within or with access to the interior of a launch tube 850. The UAV 852 includes slots 858a and 858b on either side of a battery compartment 860. As such, the moveable pinchers 856a and 856b of the robotic arm 854 can slide into slots 858a and 858b to grasp and remove a battery from the battery compartment 860. Similarly, the pinchers 856a and 856b of the robotic arm 854 could place a new battery into the battery compartment 860, once a previous battery is removed.

In a variation on the illustrated configuration, a robotic arm may be otherwise configured in the same way as shown in FIG. 8B, but may include an electromagnetic end effector that can be turned on and off, instead of pinchers. Further, the UAV may utilize batteries having at least one magnetic surface. Such an electromagnetic end effector may thus be positioned on a battery in the UAV, and then turned on to magnetically attach to the battery and hold it while the robotic arm removes the battery from the UAV. Further, the electromagnetic end effector may be turned on to magnetically attach to a new battery for the UAV, which may be stored in the launch tube or elsewhere, or may be placed in a location that is accessible to the robotic arm by human operator. The robotic arm may then move the new battery into the UAV's battery compartment, and then turn the electromagnetic end effector off and remove it from the UAV to install the new battery in the UAV. Other variations on the illustrated example, and entirely different configurations and techniques for battery replacement in a UAV, are also possible.

In some embodiments, the nest 700 may include one or more battery swapping systems instead of, or in addition to, battery charging systems. In such embodiments, the UAV 702 may include two or more power sources, such that the UAV can be continuously powered during the process of exchanging a used battery for a new battery. As such, a battery swapping system (or battery exchange system) may include one or more mechanical features that can automate the process of removing a battery from the robot, such as robotic arms, pinchers, and/or magnetic features (e.g., controllable electromagnets for attaching to and removing a battery), among other possibilities. In some embodiments, such a system may be operable to place a new battery in the UAV 702, before an old battery is removed. This may allow the UAV 702 to operate (e.g., fly) with only one battery, which may reduce weight and extend flight time.

Nest 700 may include an onboard integrated computer (not shown), which may generally control the operation of the nest (e.g., those functions that are not controlled by a human operator). The integrated computer may also be referred to as the nest's "control system." Further, the control system may include software and/or firmware to control the UAV 702 and/or to facilitate control of the UAV 702 by a human operator. Yet further, control system may generate and/or store log data, diagnostic data, and/or flight data for UAVs 702. Such data may be stored locally in data storage in the nest 700, and/or may be stored in the cloud (e.g., if an internet connection is available). The control system may also be configured to check for software updates and/or to allow for remote updates of its software.

In some embodiments, a nest 700 may also include a diagnostics system 750 for the UAV 702. Various types of diagnostic systems are possible. The diagnostics system 750 may include: (a) an onboard integrated computer 752 and (b) one or more interfaces 754 for acquiring data from a UAV. Configured as such, the diagnostics system may perform basic diagnostics on the UAV, such as testing motor controllers, propellers, and/or on-board sensors to ascertain whether these components are functioning properly and/or have been damaged.

In a further aspect, a nest 700 may include one or more systems for communicating with UAV that has been launched from the nest and is flying to or located at a target location. For example, nest 700 may include a long-range (e.g. up to 70 km) communication system configured for communications with the UAV. Such a long-range communication system may include a long-range directional antenna for RF communications with a UAV 702, as well as a directional tracking mechanism to facilitate the aiming of the directional antenna at the UAV while the UAV is in flight.

A nest 700 may also include other types of communication systems, which may allow for communications via the Internet and/or other data networks. For example, a router, modem and interface to a local wireless network may enable the nest 700 to connect to the Internet. As such, local UAV operators at the nest can run diagnostics. Further, such network connectivity may allow for remote control of some or all functions or a nest 700 and/or a UAV 702. Further, in some embodiments, nest 700 may include an integrated ground-station radar system 720 that provides air traffic control information to the nest's onboard computer. Alternatively, nest 700 may connect to a remote radar system to obtain such air traffic control information.

Figure 9:
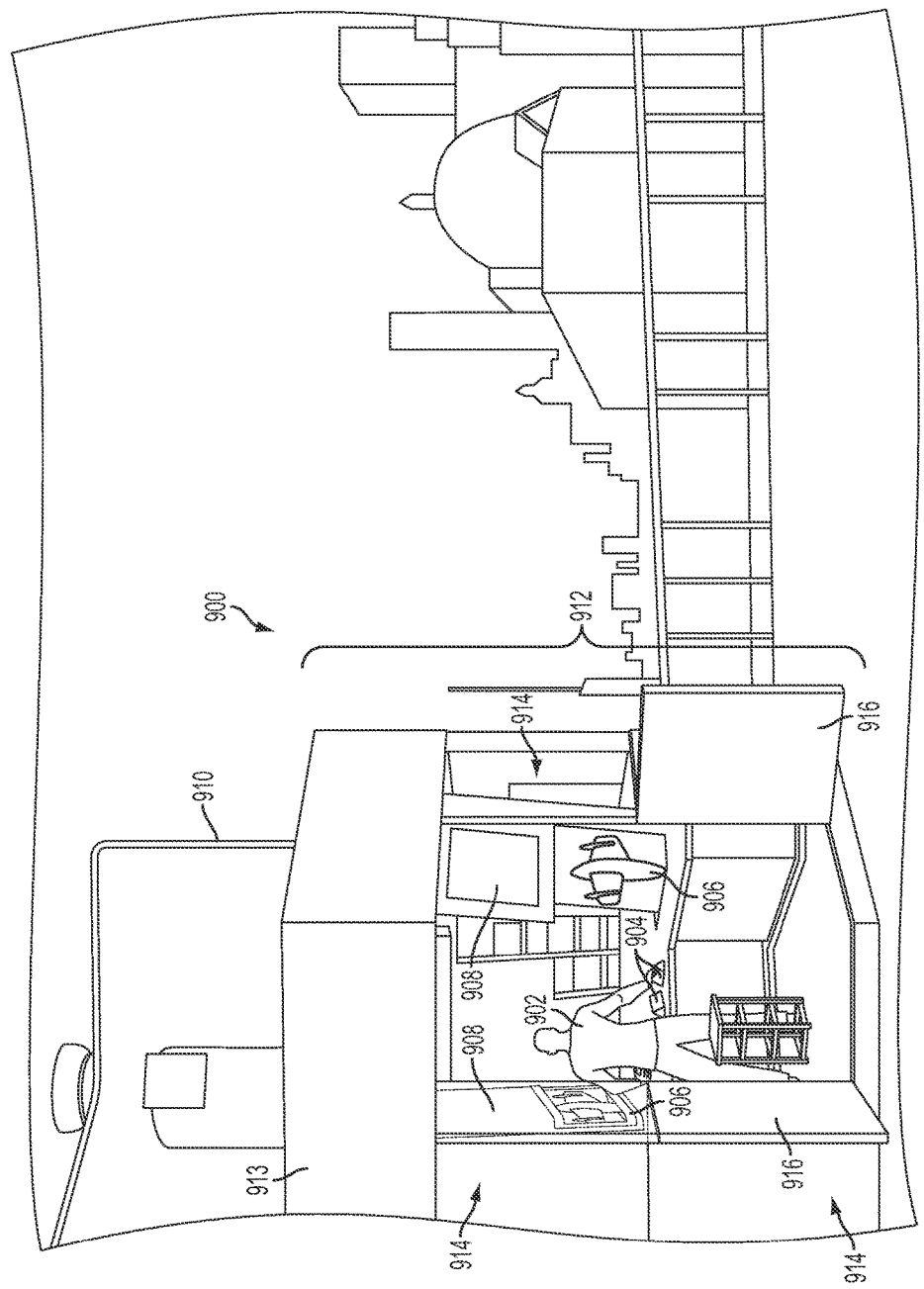
FIG. 9 is a simplified illustration of a human operator standing inside of an example nest.

As noted above, a nest may provide a "human-sized" chamber that can accommodate (e.g., shelter) a human while they are accessing and/or operating the systems within the nest. FIG. 9 is a simplified illustration of a human operator 902 standing inside of an example nest 900. Nest 900 is sized so as to accommodate the human operator 902 while the person is accessing control interfaces 904, and/or while human operator 902 is accessing UAVs 906 and/or UAV launch tubes 908, and thus may be considered to be a human-sized nest. The components of human-sized nest 900 will now be described in greater detail.

In one aspect, nest 900 includes two launch systems for two UAVs 906. (Of course, more or less launch systems, for more or less UAVs, are also possible.) In the illustrated implementation, each launch system includes a launch tube 908, and may operate in a similar manner as the launch system shown in FIG. 8A.

In another aspect, nest 900 includes a landing feature, which is arranged on the apparatus so as to receive the UAV when the UAV returns from a flight. In the illustrated implementation, the landing feature 910 is on the roof of nest 900, and may include a landing pad and/or a horizontal recovery net, such as described above in reference to FIG. 7.

In a further aspect, a frame structure 912 of nest 900 provides a human-sized chamber therein. In the illustrated implementation, the frame structure 912 is formed by a roof 913 and side sections 914. In nest 900, the side sections include: (a) opaque panels, which could be made of wood, metal, plastic, or another opaque material, and (b) at least partially transparent panels, which could be made of glass, acrylic, plastic, or another material that is at least partially transparent. It should be understood that side panels of different shapes, different sizes, and/or different opacity are possible, depending upon the particular implementation. The roof of the nest may also vary in shape, size, and/or opacity, and may be made from different materials. Further, note that doors 916 may also be considered part of the frame structure 912. And, more generally, any structural features that form part of a nest's chamber may be considered part of the nest's frame structure.

Nest 900 also includes one or more control interfaces 904, that are physically accessible from within the human-sized chamber of the nest. Control interfaces 904 allow a human operator 902 to operate the some or all of the nest's systems, and/or may allow human operator 902 to operate the UAVs

906. The control interfaces 904 may take any appropriate form, such as one or more of a keyboard, a mouse, a touchscreen, and/or a custom-designed interface (e.g., a custom layout of buttons, knobs, dials, sliders, touch pads, etc.), among other possibilities. The control interfaces 904 may provide various functions, such as control of the UAV launch systems, control of battery-replacement systems and/or battery chargers, control of the UAV while in flight (e.g., controls for manual or semi-manual flight of the UAV), control of UAV-mounted camera, controls for diagnostics systems, and/or controls for the nest's communication systems, among other possibilities.

Further, at least a portion of the launch system is disposed within the nest's chamber, such that a human operator 902 can load a UAV onto the launch system from within the chamber. Specifically, when the panel at the bottom of a launch tube 908 is raised, human operator 902 can access the launch tube 908 in order to load a UAV 906 onto the launch system. (Note that in FIG. 9, the panel at the bottom of a launch tube 908 is not visible, as it has been raised into a slot within the launch tube 908.)

VI. SELF-SERVICE KIOSK NESTS

Figure 10A:
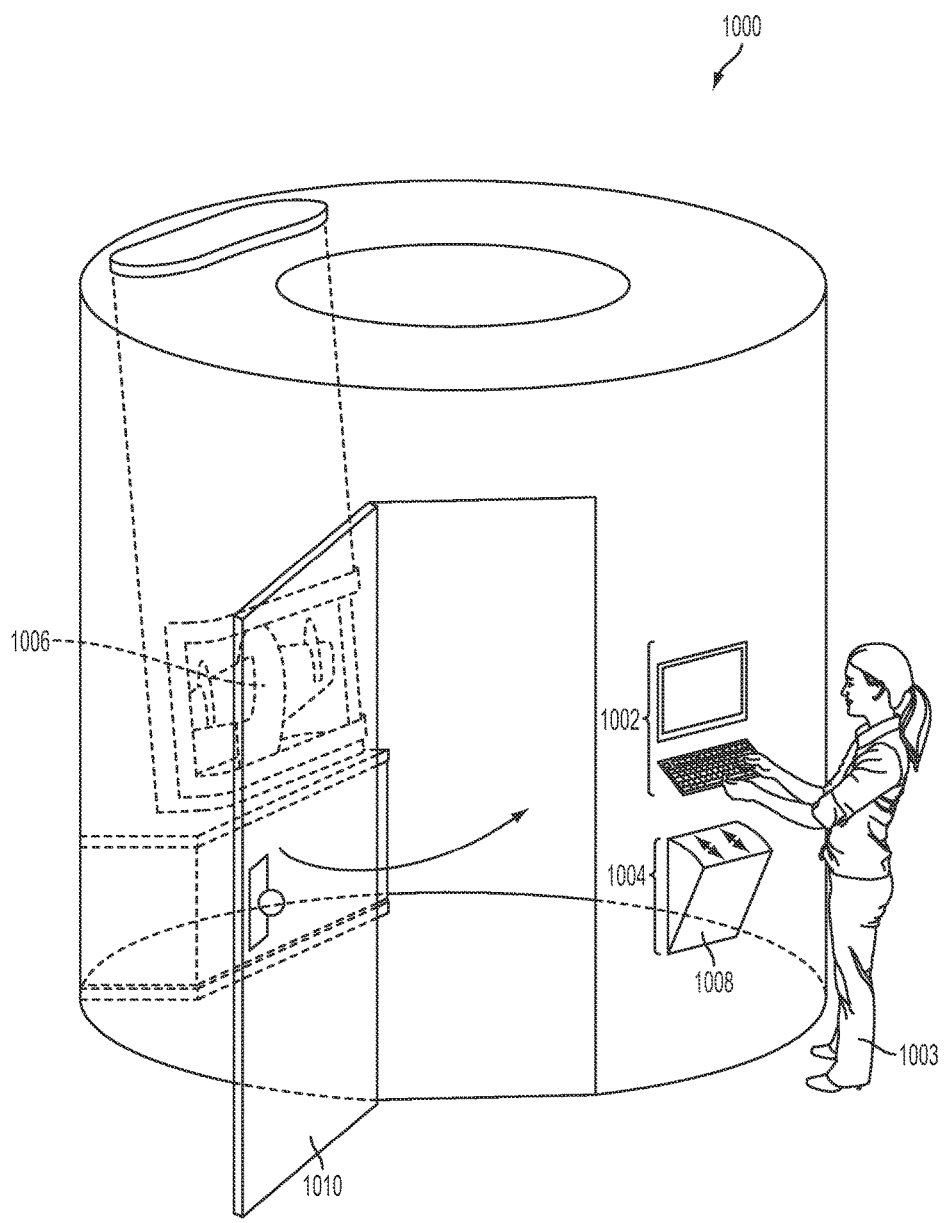
FIGS. 10A and 10B are simplified illustrations of nests configured as self-service kiosks, according to example embodiments.
Figure 10B:
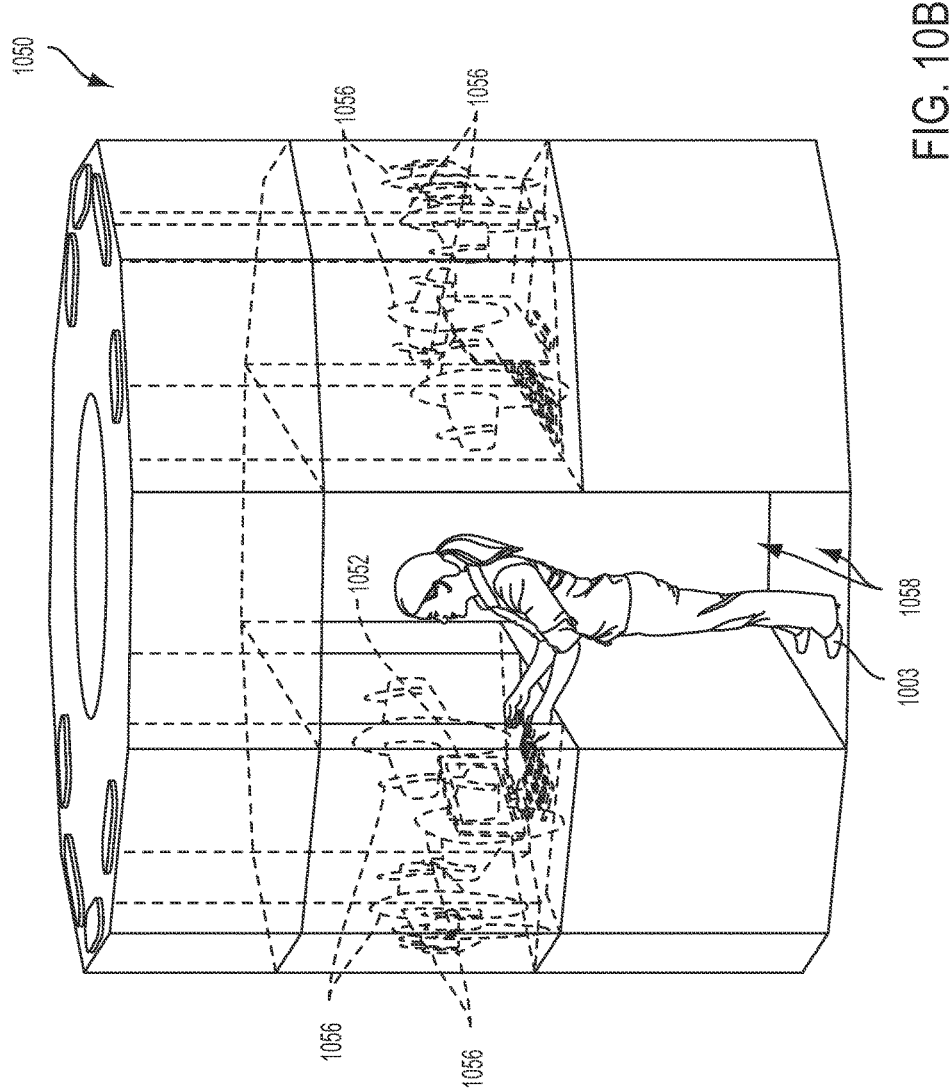

In a further aspect, a nest may be configured as a self-service kiosk, which receives packages from users and delivers them to recipient locations, possibly without a human operator present to load the package on the UAV and/or operate the UAV. Such a kiosk may allow the average, untrained person, to initiate shipment of a package on a UAV that is launched from the kiosk. FIGS. 10A and 10B are simplified illustrations of two embodiments in which nests are configured as self-service kiosks.

When configured as a self-service kiosk, a nest may include one or more user-interface components, via which a user who wants to ship a package can provide the information necessary to do so. For example, in FIG. 10A, nest 1000 includes interface components 1002, which may provide features that allow a user 1003 to send a package to a desired location or recipient on UAV 1006 that is launched from the nest. In the illustrated example, user-interface components 1002 include a display (which may be a touchscreen) and a keyboard. However, the user-interfaces components may according to the particular implementation, and may take any appropriate form, such as one or more of a keyboard, a mouse, a touchscreen, and/or a custom-designed interface (e.g., a custom layout of buttons, knobs, dials, sliders, touch pads, etc.), among other possibilities.

Regardless of which components that are utilized, a kiosk's user-interface components 1002 may be operable to: (a) receive information to facilitate delivery of a package to a target location (e.g., by allowing a user to specify the recipient name and/or address), and (b) receive or facilitate payment for the delivery of the package to the target location (e.g., a slot or slots via which a user can provide paper money or coins, a credit-card processing facility, etc.).

Further, a nest 1000 that is configured as a self-service kiosk may include a package-reception feature 1004 configured to receive a package from a user. Further, nest 1000 may include a package-loading mechanism (such as robotic arm 854, for instance), which is configured to load a package received via the package-reception feature 1004 onto the UAV for transport to the recipient. For example, a compartment door 1008 may open when a user initiates a shipment transaction via user-interface components 1002, and then close once the transaction is completed and confirmed by the user. The package-loading mechanism, which include any suitable mechanical and/or structural components, may then load the package to the UAV (e.g., by moving the package into a holding bin that is attached to the underside of the UAV). The nest's launch system can then launch the UAV with received package loaded thereon, such that the UAV can fly to the location of the specified recipient.

In other embodiments, a kiosk nest may not include a package-loading mechanism. For example, a human operator inside the nest 1000 may take a package from the package-reception feature 1004 and place the package in a holding bin on the UAV, or otherwise attach the package to the UAV, before launching the UAV.

In a further aspect, nest 1000 has a door 1010 that can be locked, and thus provides restricted access to the interior chamber of the nest. The interior chamber of nest 1000 may include the same or similar control interfaces as those described elsewhere herein. Thus, a designated human operator (not shown) can unlock door 1010 to access the interior chamber to operate and maintain UAVs using the control interfaces therein. However, the door may otherwise remain locked, such that an average person 1003 who is shipping a package from nest 1000, cannot access the interior of the nest.

An arrangement with restricted access to the interior of a nest may be desirable in various scenarios. In particular, the user-interface components 1002 on the exterior of the nest 1000 may provide the average person 1003 with the ability to initiate a shipment without any direct interaction with a human operator of the nest, while the control interfaces in the interior chamber of the nest provide functionality that the average person does not necessarily need access to. For example, in some cases, a human operator inside the nest may be present when person 1003 initiates a shipment, such that the human operator can launch the UAV, operate the UAV during flight to the delivery location, and so on.

In other cases, automated systems may load the package onto the UAV, generate a flight plan to the delivery location, launch the UAV, and control the UAV during flight to the delivery location and/or during a return flight from the delivery location to the nest. For example, the nest 1050 shown in FIG. 10B is configured as a substantially autonomous self-service kiosk.

In particular, the average person 1053 who wishes to send a package may enter the nest 1050 through openings 1058, and access the user-interface components 1052 within the nest in order to initiate a shipment with a UAV 1056. Automated systems, which do not require the presence of a human operator, may then load the person's package onto one of the UAVs 1056, generate flight plans to the delivery location, launch the UAV on which the package is loaded, and control the UAV during flight to the delivery location and/or during a return flight from the delivery location to the nest.

VII. CONCLUSION

While the examples described herein include only a single interface feature, it should be understood that in some embodiments, a peripheral device may include two or more interface features, which may be operable to control different functions of an HIVID. Further, in some embodiments, a peripheral device may include a combination of two or more different types of interface features (e.g., a button and switch).

While various aspects of the disclosure have been disclosed herein, other aspects and embodiments will be apparent to those skilled in the art. Accordingly, the embodiments disclosed herein are for purposes of illustration, and are not intended to be limiting, with the true scope and spirit of the disclosure being indicated by the following claims.

What is claimed is:

1. An apparatus comprising:
   a launch system for an unmanned aerial vehicle (UAV);
   a landing feature that is arranged on the apparatus so as to receive the UAV when the UAV returns from a flight;
   a mechanical battery-replacement system that is configured to:
   (a) remove a first battery from the UAV, and
   (b) after removal of the first battery, install a second battery in the UAV; and
   a frame structure comprising:
   a roof, and
   a chamber beneath the roof,
   wherein the launch system is arranged to:
   couple to the UAV at a location inside the chamber, and move the UAV out of the chamber during a launch process, and
   wherein the landing feature is arranged on the roof of the frame structure.

2. The apparatus of claim 1, wherein the launch system comprises a UAV attachment feature within a compartment,
   wherein the UAV attachment feature connects to a launch mechanism, and
   wherein a panel that is moveable to a first position to provide access to the compartment such that the UAV attachment feature is accessible at the coupling location within the chamber, and is moveable to a second position to restrict access to the compartment.

3. The apparatus of claim 2, wherein the launch system requires the moveable panel to be in the second position in order for a launch process to be initiated.

4. The apparatus of claim 2,
   wherein the launch system further comprises a launch tube, and
   wherein the launch mechanism comprises:
   a rail, and
   a motor configured to move the attachment feature upward through the launch tube such that when the UAV that is attached to the attachment feature the UAV is propelled through an opening at a top end of the launch tube.

5. The apparatus of claim 4, wherein the launch system further comprises a hatch at the top end of the launch tube, wherein the hatch is configured to open as part of a launch process, and to otherwise remain closed.

6. The apparatus of claim 1, wherein the landing feature comprises at least one visible feature to assist a UAV in landing on the landing feature.

7. The apparatus of claim 1, wherein the landing feature comprises a zero-impact grass surface on which a UAV can land.

8. The apparatus of claim 1;
   wherein the landing feature comprises a recovery net adjacent to a landing pad, and
   wherein the recovery net is arranged such that when the UAV is in the process of landing, the recovery net guides the UAV towards the landing pad.

9. The apparatus of claim 1, further comprising a diagnostics system for the UAV, wherein the diagnostics system comprises at least:
   (a) an onboard integrated computer, and
   (b) one or more communication interfaces for acquiring data from the UAV.

10. The apparatus of claim 9, wherein the onboard integrated computer is programmed to generate vehicle log data.

11. The apparatus of claim 1, further comprising one or more communication systems.

12. The apparatus of claim 11, wherein the one or more communication systems comprise a long-range communication system configured for communications with the UAV after the UAV has been launched from the apparatus and is in flight to a target location.

13. The apparatus of claim 11, wherein the one or more communication systems comprise a radar system that is operable to receive air-traffic control data.

14. The apparatus of claim 1, wherein the apparatus is operable for self-service UAV delivery of a package, the apparatus further comprising:
   one or more user-interface components, wherein the one or more user-interface components are operable to:
   (a) receive information to facilitate delivery of a package to a target location, and
   (b) receive payment for the delivery of the package to the target location; and
   a package-reception feature configured to receive the package; and
   wherein the launch system is operable to launch the UAV with received package loaded thereon.

15. An apparatus comprising:
   a launch system for an unmanned aerial vehicle (UAV);
   a landing feature that is arranged on the apparatus so as to receive the UAV when the UAV returns from a flight;
   a frame structure that comprises:
   a roof, and
   one or more side sections, wherein the one or more side sections and the roof form a human-sized chamber that is at least partially enclosed;
   one or more human-operable control interfaces that are physically accessible from within the human-sized chamber, wherein the one or more human-operable control interfaces are operable to control at least the launch system;
   wherein at least a portion of the launch system is disposed within the human-sized chamber such that the UAV can be loaded onto the launch system at a coupling location within the human-sized chamber,
   wherein the launch system is operable for a launch process in which the UAV moved out of the chamber, and
   wherein the landing feature is at least partially disposed on the roof.

16. The apparatus of claim 15, further comprising a diagnostics system for the UAV, wherein the diagnostics system comprises at least:
   (a) an onboard integrated computer, and
   (b) one or more communication interfaces for acquiring data from a UAV.

17. The apparatus of claim 15, wherein the apparatus is configured as a self-service kiosk.

* * * * *